(12) United States Patent
Nomura

(10) Patent No.: US 9,570,923 B2
(45) Date of Patent: Feb. 14, 2017

(54) ADJUSTING DEVICE, BATTERY PACK, AND ADJUSTING METHOD

(71) Applicant: NEC Corporation, Tokyo (JP)

(72) Inventor: Youjirou Nomura, Tokyo (JP)

(73) Assignee: NEC Corporation, Tokyo (JP)

( * ) Notice: Subject to any disclaimer, the term of this patent is extended or adjusted under 35 U.S.C. 154(b) by 152 days.

(21) Appl. No.: 14/379,389

(22) PCT Filed: Jan. 24, 2013

(86) PCT No.: PCT/JP2013/051408
§ 371 (c)(1),
(2) Date: Aug. 18, 2014

(87) PCT Pub. No.: WO2013/121849
PCT Pub. Date: Aug. 22, 2013

(65) Prior Publication Data
US 2015/0035492 A1 Feb. 5, 2015

(30) Foreign Application Priority Data
Feb. 16, 2012 (JP) .................. 2012-031730

(51) Int. Cl.
H02J 7/00 (2006.01)
H01M 10/42 (2006.01)
H01M 10/44 (2006.01)

(52) U.S. Cl.
CPC .......... *H02J 7/0014* (2013.01); *H01M 10/425* (2013.01); *H01M 10/441* (2013.01);
(Continued)

(58) Field of Classification Search
CPC .................................................. H02J 7/1423
(Continued)

(56) References Cited

U.S. PATENT DOCUMENTS 6,262,494 B1 7/2001 Tsukuni et al.
2005/0140336 A1 6/2005 Anzawa et al.
(Continued)

FOREIGN PATENT DOCUMENTS

EP 2 372 867 A1 10/2011
EP 2 658 076 A1 10/2013
(Continued)

OTHER PUBLICATIONS

Extended European Search Report mailed on Sep. 28, 2015 by the European Patent Office in counterpart European Patent Application No. 13748921.7.
(Continued)

*Primary Examiner* — Suresh Memula
(74) *Attorney, Agent, or Firm* — Finnegan, Henderson, Farabow, Garrett & Dunner, L.L.P.

(57) ABSTRACT

An adjusting device that is connected to a load and to a plurality of storage battery units that are connected together in parallel and that adjusts voltage differences among the plurality of storage battery units includes: for each of the storage battery units, a switch that is provided between a storage battery unit and the load that is turned ON during detection intervals for detecting current from the storage battery unit, a detection means that detects the current supplied from each of the storage battery units during the detection interval, and an adjusting means that, based on the detection results of the detection means, controls the ON/OFF states of switches during the adjustment intervals for adjusting voltage differences such that the voltage differences among the plurality of storage battery units are decreased.

13 Claims, 5 Drawing Sheets

(52) U.S. Cl.
CPC ............ *H02J 7/007* (2013.01); *H02J 7/0016* (2013.01); *H01M 2010/4271* (2013.01)

(58) Field of Classification Search
USPC .......................................................... 320/126
See application file for complete search history.

(56) References Cited

U.S. PATENT DOCUMENTS

| | | | |
|---|---|---|---|
| 2011/0068744 A1* | 3/2011 | Zhu | H02J 7/0016 320/116 |
| 2011/0279085 A1* | 11/2011 | Shigemizu | H01M 10/441 320/117 |
| 2014/0247005 A1* | 9/2014 | Graham | H02J 7/0054 320/107 |
| 2015/0372514 A1* | 12/2015 | Kobayashi | H01M 10/482 320/134 |

FOREIGN PATENT DOCUMENTS

| | | |
|---|---|---|
| JP | 2-179229 | 7/1990 |
| JP | 2007-166715 | 6/2007 |
| JP | 2009-033936 | 2/2009 |
| JP | 2009-212020 | 9/2009 |
| JP | 2010-29015 | 2/2010 |

OTHER PUBLICATIONS

International Search Report mailed Apr. 16, 2013.

* cited by examiner

ADJUSTING DEVICE, BATTERY PACK, AND ADJUSTING METHOD

CROSS-REFERENCE TO RELATED PATENT APPLICATIONS

This application is a National Stage Entry of International Application No. PCT/JP2013/051408, filed Jan. 24, 2013, which claims priority from Japanese Patent Application No. 2012-031730, filed Feb. 16, 2012. The entire contents of the above-referenced applications are expressly incorporated herein by reference.

TECHNICAL FIELD

The present invention relates to an adjusting device, a battery pack, and an adjusting method, and more particularly relates to an adjusting device that adjusts voltage differences among a plurality of storage battery units that are connected in parallel, and to a battery pack and an adjusting method.

BACKGROUND ART

Battery packs are known in which a plurality of storage batteries (for example, a plurality of lithium ion secondary battery cells) are connected.

Patent Document 1 discloses a battery pack system having a plurality of series cell units in which a plurality of storage batteries are connected in a series, the plurality of series cell units being connected in parallel.

In the battery pack in which series cell units (storage battery units) are connected in parallel, the problems arise that variations in voltage among the series cell units cause cross currents to flow from series cell units having high voltage to series cell units having low voltage during charging. A reduction of variations in voltage among the series cell units is therefore to be desired.

In the battery pack system described in Patent Document 1, current control elements that can each adjust the magnitude of current that flows through its own current control element, for example, MOSFET (Metal Oxide Semiconductor Field Effect Transistors), are each connected in series to a respective series cell unit, and by using each current control element to control the magnitude of current that flows to each series cell unit, variations in the voltage among the series cell units are reduced.

The current control element disclosed in Patent Document 1 is an element that adjusts the magnitude of current that flows through its own element by adjusting its own resistance value.

LITERATURE OF THE PRIOR ART

Patent Documents

Patent Document 1: Japanese Unexamined Patent Application Publication No. 2010-029015

SUMMARY OF THE INVENTION

Problem to be Solved by the Invention

The battery pack system described in Patent Document 1 uses current control elements to reduce variations in voltage among series cell units.

As a result, when the resistance value of current control elements is great in the battery pack system described in Patent Document 1, power consumption increases.

Accordingly, the battery pack system described in Patent Document 1 is able to reduce variations in voltage among series cell units but suffers from the problem of high power consumption.

It is therefore an object of the present invention to provide an adjusting device, a battery pack device, and an adjusting method that can solve the above-described problem.

Means for Solving the Problem

The adjusting device of the present invention is an adjusting device which is connected to a load and to a plurality of storage battery units that are connected in parallel, and which adjusts voltage differences among the plurality of storage battery units, the adjusting device including:

switches that are provided between the storage battery unit and the load for each of the storage battery units, and that are turned ON during detection intervals for detecting currents from the storage battery units;

detection means that detects current that are supplied from each of the plurality of storage battery units in the detection intervals; and adjusting means that, based on the detection result of the detection means, controls the ON/OFF state of the switches during adjustment intervals, in which voltage differences among the plurality of storage battery units are adjusted, such that the voltage differences are reduced.

The battery pack device of the present invention includes a plurality of storage battery units that are connected in parallel and the above-described adjusting device.

The adjusting method of the present invention is an adjusting method that is carried out by an adjusting device that is connected to a load and to a plurality of storage battery units that are connected in parallel, the adjusting method including:

for each of the storage battery units, turning ON each switch that is provided between the load and the storage battery unit during detection intervals for detecting current from the storage battery unit;

detecting the current that is supplied from each of the plurality of storage battery units during the detection intervals; and based on the detection results of the current, controlling the ON/OFF state of the switches during adjustment intervals for adjusting the voltage differences such that the voltage differences among the plurality of storage battery units is reduced.

Effect of the Invention

According to the present invention, voltage differences among a plurality of storage battery units can be reduced while suppressing increase of power consumption.

MODE FOR CARRYING OUT THE INVENTION

An exemplary embodiment of the present invention is next described with reference to the accompanying drawings.

Figure 1:
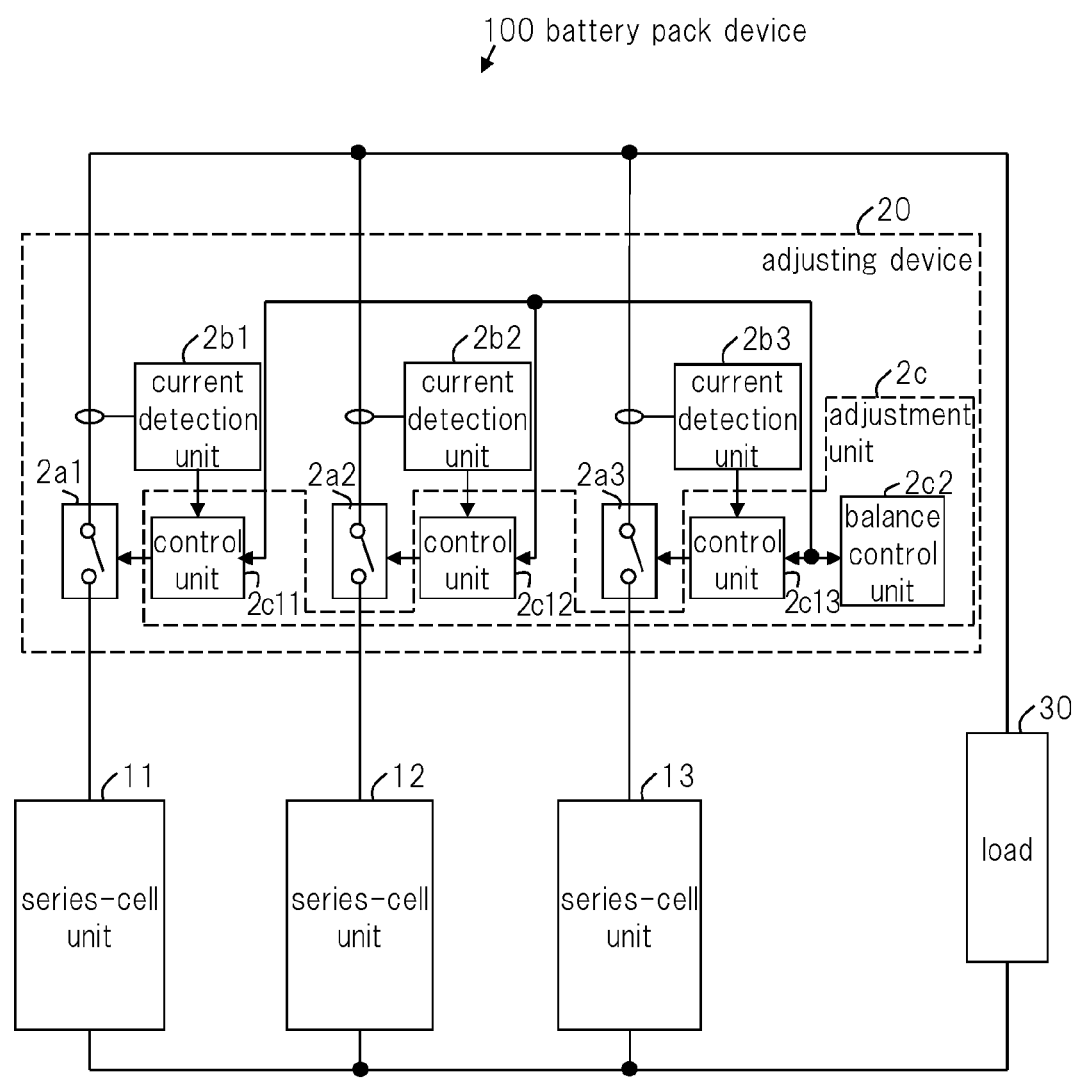
FIG. 1 is a block diagram showing battery pack device 100 of an exemplary embodiment of the present invention.

FIG. 1 is a block diagram showing battery pack device 100 of an exemplary embodiment of the present invention.

In FIG. 1, battery pack device 100 includes series-cell units 11-13 and adjusting device 20 and is connected to load 30.

Series-cell units 11-13 are an example of the plurality of storage battery units. Series cell units 11-13 are connected together in parallel. Series cell units 11-13 each have a plurality of storage batteries (for example, a plurality of lithium ion secondary battery cells) that are connected in a series.

The storage batteries are not limited to lithium ion secondary battery cells and can be modified as appropriate. In addition, one secondary battery cell may be used as the storage battery unit in place of series cell units. Still further, although three series cell units are shown in FIG. 1, the number of series cell units may be two or more.

Adjusting device 20 is connected to series cell units 11-13 and load 30.

Adjusting device 20 includes switches 2a1-2a3, current detection units 2b1-2b3, and adjustment unit 2c. Adjustment unit 2c includes control units 2c11-2c13 and balance control unit 2c2.

Switches 2a1-2a3 are provided between load 30 and series cell units 11-13, respectively. In the present exemplary embodiment, switch 2a1 is provided between series cell unit 11 and load 30, switch 2a2 is provided between series cell unit 12 and load 30, and switch 2a3 is provided between series cell unit 13 and load 30.

Switches 2a1-2a3 are ON in detection intervals for detecting current from series-cell units 11-13.

Each of series cell units 11-13 is discharged when the switch to which the series cell unit is connected is ON. The magnitude of the current that is supplied from a series cell unit is proportional to the level of the voltage of the series cell unit. In addition, series-cell units 11-13 are charged by a charger (not shown).

Current detection units 2b1-2b3 are examples of the detection means.

Each of current detection units 2b1-2b3 detects current that is supplied from series cell units 11-13, respectively, in detection intervals. In the present exemplary embodiment, current detection unit 2b1 detects current that is supplied from series cell unit 11, current detection unit 2b2 detects current supplied from series cell unit 12, and current detection unit 2b3 detects current that is supplied from series cell unit 13.

Adjustment unit 2c is an example of the adjusting means. Based on the detection results of current detection units 2b1-2b3, adjustment unit 2c controls the ON/OFF of switches 2a1-2a3 during adjustment intervals for adjusting voltage differences of series cell units 11-13 such that the voltage differences among series cell units 11-13 are reduced.

Control units 2c11-2c13 receive the detection results of current detection units 2b1-2b3, respectively, and supply the detection results of current detection units 2b1-2b3 to balance control unit 2c2. In the present exemplary embodiment, control unit 2c11 supplies the detection result of current detection unit 2b1 to balance control unit 2c2, control unit 2c12 supplies the detection result of current detection unit 2b2 to balance control unit 2c2, and control unit 2c13 supplies the detection result of current detection unit 2b3 to balance control unit 2c2.

In addition, control units 2c11-2c13 control the ON/OFF of switches 2a1-2a3, respectively, in accordance with adjustment instructions from balance control unit 2c2.

Balance control unit 2c2 manages during detection intervals and adjustment intervals.

Figure 2:
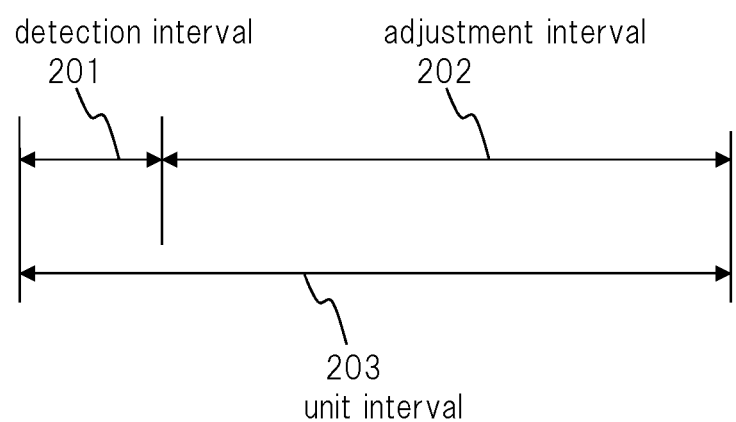
FIG. 2 shows the relation between a detection interval and an adjustment interval.

FIG. 2 shows the relation between a detection interval and an adjustment interval.

As shown in FIG. 2, detection interval 201 and adjustment interval 202 are contained in unit interval 203 used for checking for voltage differences of series cell units 11-13 and adjusting these voltage differences. As unit interval 203, a time interval of, for example, one minute or one second is set.

Unit interval 203 is preferably set according to the amount of electric power of series cell units 11-13 and the withstand voltage and withstand current of control units 2c11-2c13.

In addition, the ratio of the lengths of detection interval 201 and adjustment interval 202 can be set as appropriate, and for example, is set according to the characteristic of battery pack device 100.

In detection interval 201, balance control unit 2c2 uses control units 2c11-2c13 to turn ON switches 2a1-2a3 and cause current detection units 2b1-2b3 to detect current.

In adjustment interval 202, balance control unit 2c2 determines the ON/OFF timing of switches 2a1-2a3 based on the detection results of current detection units 2b1-2b3 during detection interval 201 such that the voltage differences among series cell units 11-13 are reduced.

Balance control unit 2c2 supplies, as adjustment instructions to control units 2c11-2c13, instructions that indicate the ON/OFF timing of each of switches 2a1-2a3. In the present exemplary embodiment, balance control unit 2c2 supplies an adjustment instruction that indicates the ON/OFF timing of switch 2a1 to control unit 2c11, supplies an adjustment instruction that indicates the ON/OFF timing of switch 2a2 to control unit 2c12, and supplies an adjustment instruction that indicates the ON/OFF timing of switch 2a3 to control unit 2c13.

Load 30 is, for example, a residential electric apparatus. However, load 30 is not limited to a residential electric apparatus and may also be a predetermined load and can be modified as appropriate.

The operation is next described.

Figure 3:
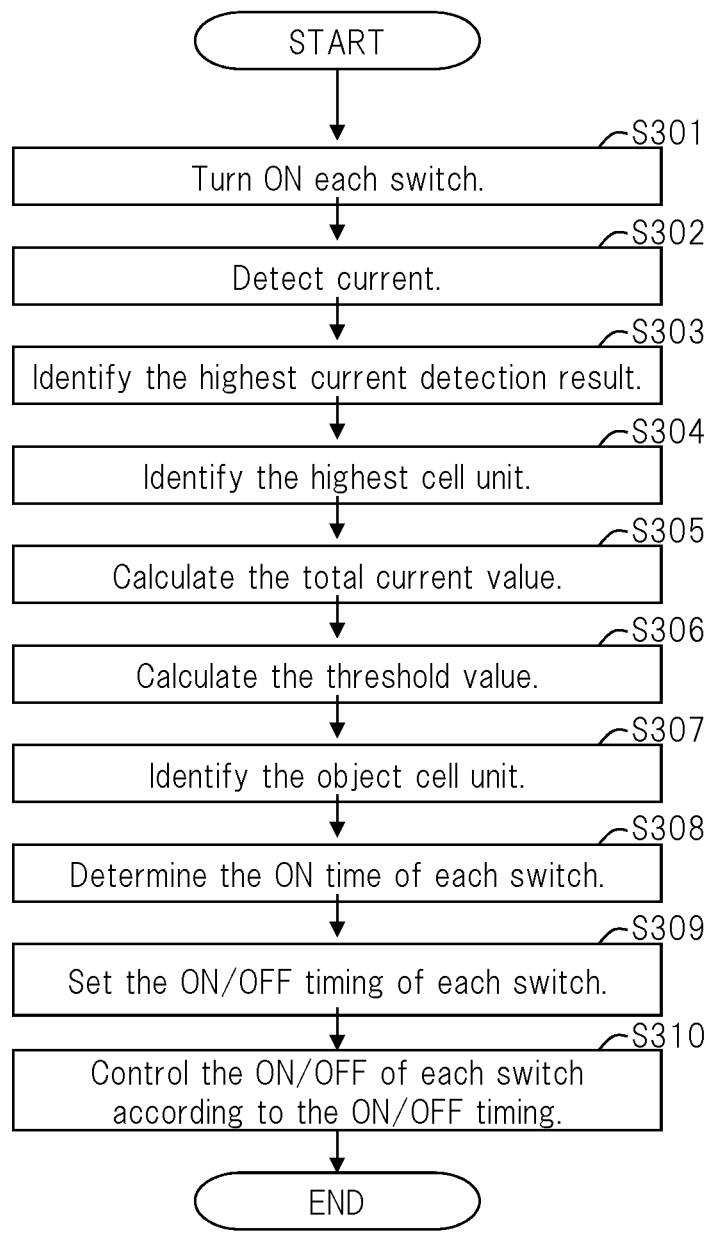
FIG. 3 is a flow chart for describing the operation of adjusting device 20.

FIG. 3 is a flow chart for describing the operation of adjusting device 20.

At the time of detection interval 201, balance control unit 2c2 supplies ON instructions to control units 2c11-2c13 to turn ON switches. Upon receiving the ON instructions, control units 2c11-2c13 each turn ON switches 2a1-2a3, respectively (Step S301), whereby series cell units 11-13 carry out discharging.

Next, current detection units 2b1-2b3 detect the currents that are supplied from series cell units 11-13, respectively, during discharging (Step S302). Current detection units 2b1-2b3 supply the current detection results to control units 2c11-2c13, respectively.

Upon receiving the current detection results, each of control units 2c11-2c13 supplies the current detection results to balance control unit 2c2. The current detection results each show the series cell unit that supplied the current.

Upon receiving the current detection results, balance control unit 2c2 saves the current detection results.

Balance control unit 2c2 next identifies the highest current detection result that indicates the highest current from among the current detection results that were saved (Step S303).

Balance control unit 2c2 then refers to the detection results of current that were saved and identifies the series cell unit that supplied the highest current (hereinbelow referred to as "highest cell unit") from among series cell units 11-13 (Step S304).

Balance control unit 2c2 then adds up the currents that were indicated in the current detection results that were saved to calculate the total current value (Step S305).

Balance control unit 2c2 next multiplies a reference value that was set in advance according to the rated current of adjusting device 20 by the value obtained by dividing the total current value by the rated current of adjusting device 20 to calculate a threshold value (Step S306).

The reference value and the rated current of adjusting device 20 are stored in advance in balance control unit 2c2.

Balance control unit 2c2 next refers to the detection results of currents that were saved and identifies from among series cell units 11-13 the series cell units (hereinbelow referred to as the "object cell units") that supplied a current for which the difference from the highest current is greater than the threshold value (Step S307). The object cell units are an example of the object storage battery units.

Balance control unit 2c2 then determines, in units of object cell units, the ON time within adjustment interval 202 of the switches (hereinbelow referred to as the "object switches") among switches 2a1-2a3 that are connected to the object cell units.

In the present exemplary embodiment, balance control unit 2c2 performs setting such that the ON time within adjustment interval 202 of an object switch is "0" when there is one object switch, and when there is a plurality of object switches, performs setting such that the ON time within adjustment interval 202 of an object switch becomes shorter as the difference increases between the highest current and the current from the object unit to which the object switch is connected. In addition, balance control unit 2c2 sets ON switches that are connected to series cell units other than object cell units during adjustment interval 202 (Step S308).

During discharging, the series cell units supply more current as the voltage increases.

As a result, by means of the settings of Step S308, the discharging time becomes shorter for object cell units having lower voltage, and the amount of decrease of the voltage due to discharging also decreases. Thus, when each switch operates at the ON times set by balance control unit 2c2, the voltage differences among the series cell units decrease.

Still further, when there is a plurality of object cell units, balance control unit 2c2 sets the ON/OFF timing within adjustment interval 202 of each object switch such that the discharge halt intervals of object cell units do not overlap (Step S309).

For example, balance control unit 2c2 sets the ON/OFF timing within adjustment interval 202 of each object switch by adjusting the positions in adjustment interval 202 of the ON time of each object switch that were set in Step S308 such that the discharge halt intervals of the object cell units do not overlap.

If the discharge halt intervals of object cell units should overlap despite the adjustment of the positions of the ON times of each object switch during adjustment interval 202, balance control unit 2c2 decreases the ON times of each object switch at an equal proportion, and then sets the ON/OFF timing within adjustment interval 202 of each object switch by adjusting the positions of the ON times of each object switch within adjustment interval 202 such that the discharge halt times of the object cell units do not overlap.

At the time of adjustment interval 202, balance control unit 2c2 then supplies, as adjustment instructions to each of control units 2c11-2c13, instructions that indicate the ON/OFF timing of each of switches 2a1-2a3 that were set in Step S309.

Each of control units 2c11-2c13 implements ON/OFF control of switches 2a1-2a3, respectively, in accordance with the adjustment instructions from balance control unit 2c2 (Step S310)

An example of the present exemplary embodiment is next described.

Under conditions in which series cell units 11-16 are provided as the plurality of series cell units, switches 2a1-2a6, current detection units 2b1-2b6, and control units 2c11-2c16 are provided corresponding to series cell units 11-16, balance control unit 2c2 is provided, the current from series cell unit 11 is 37.5 A, the current from series-cell unit 12 is 33.75 A, the current from series cell unit 13 is 30 A, the current from series cell unit 14 is 30 A, the current from series cell unit 15 is 26.25 A, the current from series cell unit 16 is 22.5 A, the rated current is 240 A, and the reference value is 10, balance control unit 2c2 operates as described hereinbelow.

Balance control unit 2c2 identifies 37.5 A as the highest current, identifies series cell unit 11 as the highest cell unit, calculates 180 A as the total current value, and calculates 7.5 as the threshold value.

Balance control unit 2c2 next identifies series-cell units 15 and 16 as object cell units.

Balance control unit 2c2 then calculates the difference "11.25 A" between the current "26.25 A" from series cell unit 15 and the highest current "37.5 A," and further, calculates the difference "15 A" between the current "22.5 A" from series cell unit 16 and the highest current "37.5 A."

Balance control unit 2c2 then multiplies the difference "11.25" of series cell unit 15 by the adjustment unit time interval that was set in advance to calculate the discharge OFF time of series-cell unit 15 during adjustment interval 202.

The adjustment unit time interval is, for example, a time interval that has been set according to adjustment interval 202 (for example, a time interval obtained by dividing adjustment interval 202 by 100, which is a predetermined value). The predetermined value is not limited to 100 and can be modified as appropriate. For example, the total value of the difference "11.25" pertaining to series cell unit 15 and the difference "15" pertaining to series cell unit 16 may also be used as the predetermined value.

Balance control unit 2c2 next multiplies the difference "15" pertaining to series cell unit 16 by the adjustment unit time to calculate the discharge OFF time interval of series cell unit 16 in adjustment interval 202.

Balance control unit 2c2 next sets the time interval obtained by subtracting the discharge OFF time interval of series cell unit 15 from adjustment interval 202 as the ON time interval within adjustment interval 202 of switch (object switch) 2a5 that is connected to series cell unit 15.

Balance control unit 2c2 then sets the time interval obtained by subtracting the discharge OFF time interval of series cell unit 16 from adjustment interval 202 as the ON time interval within adjustment interval 202 of switch (object switch) 2a6 that is connected to series cell unit 16.

Balance control unit 2c2 next determines the ON/OFF timing within adjustment interval 202 of object switches 2a5 and 2a6 such that the OFF time interval within adjustment interval 202 of object switch 2a5 does not overlap with the OFF time interval within adjustment interval 202 of object switch 2a6.

Figure 4:
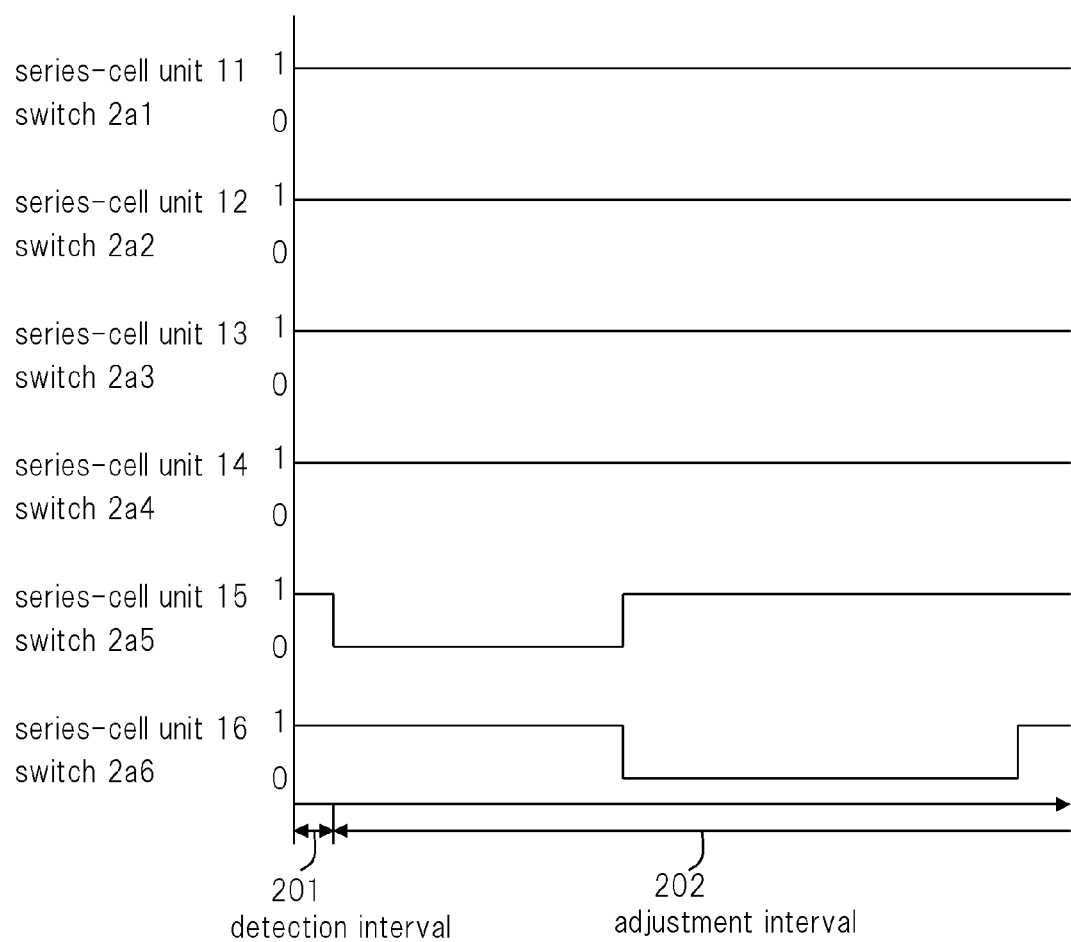
FIG. 4 shows an example of the ON/OFF timing of each switch.

FIG. 4 shows an example of the ON/OFF timing of switches 2a1-2a6 that are connected to series cell units 11-16, respectively. In FIG. 4, "1" indicates ON and "0" indicates OFF.

Balance control unit 2c2 next supplies, as adjustment instructions to each of control units 2c11-2c16, instructions indicating the ON/OFF timing of each of switches 2a1-2a6.

Upon receiving the adjustment instructions, control units 2c11-2c16 control the ON/OFF states of switches 2a1-2a6, respectively, in accordance with the adjustment instructions.

The effect of the present exemplary embodiment is next described.

According to the present exemplary embodiment shown in FIG. 1, switches 2a1-2a3 are provided between load 30 and series-cell units 11-13 for each series cell unit and enter the ON state in detection interval 201 for detecting current from the series cell units.

Current detection units 2b1-2b3 detect the currents that are supplied from series cell units 11-13, respectively, during detection interval 201.

Based on the detection results of current detection units 2b1-2b3, adjustment unit 2c controls the ON/OFF of switches 2a1-2a3 in adjustment interval 202 for adjusting the voltage differences such that the voltage differences among series cell units 11-13 are reduced.

In the present exemplary embodiment, the voltage differences among series cell units 11-13 are reduced by controlling the ON/OFF of switches 2a1-2a3.

As a result, the present exemplary embodiment can eliminate the need for adjusting the resistance value of current control elements to control the magnitude of the current that flows to each series cell unit that was described in the battery pack system of Patent Document 1 and can thus avoid the problem of a large amount of power that is consumed by current control elements when the resistance value of the current control elements is high. As a result, voltage differences among a plurality of series cell units can be reduced while suppressing an increase in power consumption.

The effect described above is exhibited by adjusting device 20 that is made up of switches 2a1-2a3, current detection units 2b1-2b3, and adjustment unit 2c.

Figure 5:
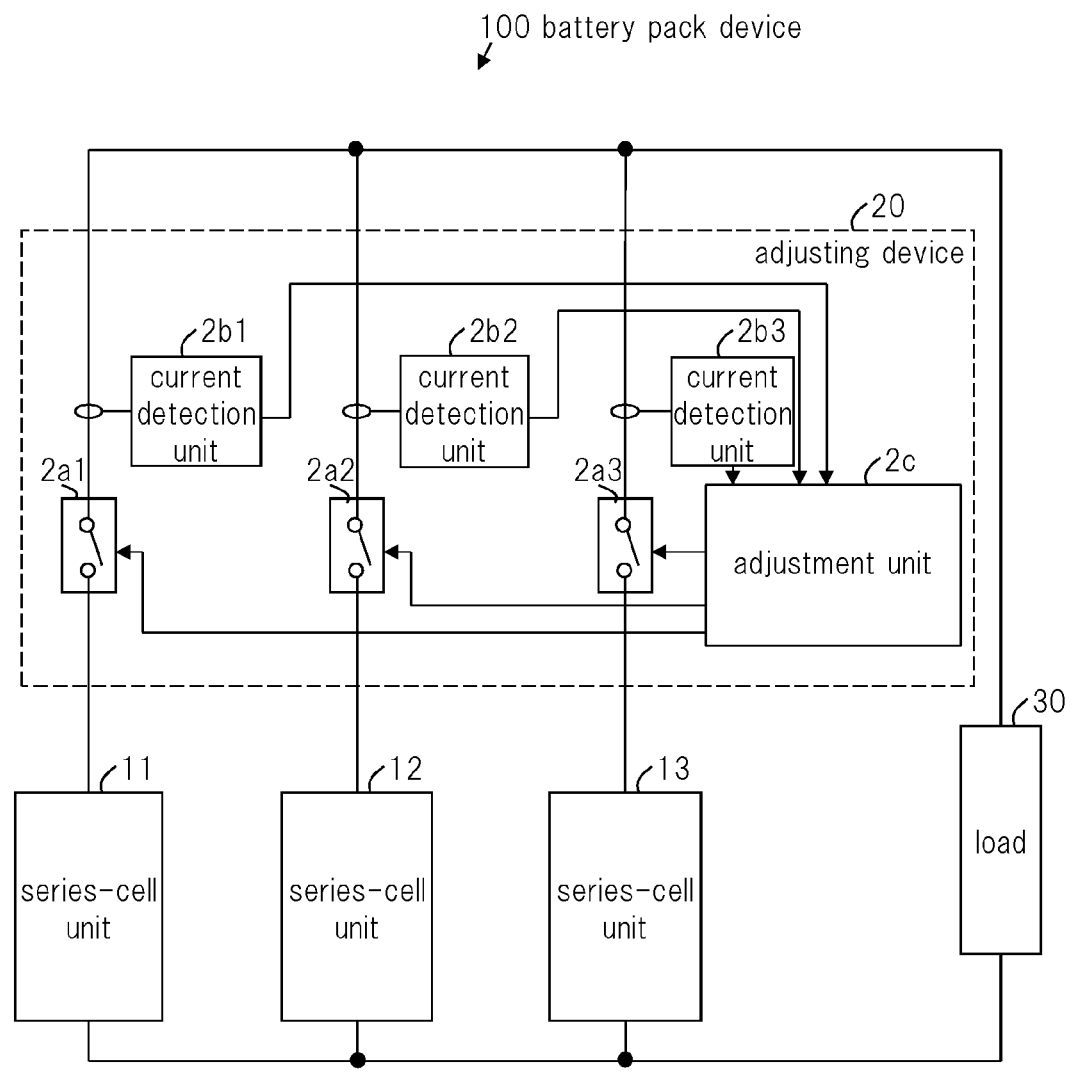
FIG. 5 shows adjusting device 20 that is made up of switches 2a1-2a3 and current detection unit 2b1-2b3, and adjustment unit 2c.

FIG. 5 shows adjusting device 20 that is made up of switches 2a1-2a3, current detection units 2b1-2b3, and adjustment unit 2c.

In the present exemplary embodiment, adjustment unit 2c identifies, from among series cell units 11-13, object cell units that supplied current that differs from the highest current by more than a threshold value. Of switches 2a1-2a3, adjustment unit 2c turns ON those switches that are connected to series cell units other than the object cell units during adjustment interval 202. Of switches 2a1-2a3, adjustment unit 2c makes the ON time interval within adjustment interval 202 of object switches that are connected to object cell units shorter than adjustment interval 202.

At the time of discharging, series cell units supply more current as the voltage increases. As a result, according to the present exemplary embodiment, the discharging time intervals of object cell units, in which the voltage is lower than in series cell units other than the object cell units, are shorter than the discharging time interval of series cell units other than the object cell units. The shorter the discharge time of the series cell units, the less the amount of decrease of the voltage due to discharge. As a result, the voltage differences among the series cell units can be decreased.

Accordingly, voltage differences among a plurality of series cell units can be decreased while suppressing an increase in power consumption.

Still further, in the present exemplary embodiment, when there is a plurality of object switches, adjustment unit 2c shortens the ON time interval within adjustment interval 202 of an object switch in proportion to the magnitude of the difference between the highest current and the current from the object cell unit to which that object switch is connected.

As a result, the discharge time intervals become shorter for object cell units having lower voltage, and the amount of decrease in voltage resulting from discharge decreases. As a result, voltage differences among object cell units can be decreased.

In the present exemplary embodiment, adjustment unit 2c multiplies a value obtained by dividing the total current value by the rated current of adjusting device 20 by a reference value that is set according to the rated current of adjusting device 20 to calculate a threshold value.

As a result, the reference value that is set according to the rated current can be adjusted according to the ratio of the total current value and the rated current.

In the above-described exemplary embodiment, moreover, the threshold value was calculated by multiplying the value obtained by dividing the total current value by the rated current of adjusting device 20 by a reference value, but the threshold value is not limited to this value. For example, adjustment unit 2c may also use as the threshold value a value obtained by subtracting the average value of the currents that were detected by current detection units 2b1-2b3 from the highest current, or may use a fixed value (for example, "0") as the threshold value.

In the exemplary embodiment described hereinabove, the configurations shown in the figures are only examples, and the present invention is not limited to these configurations.

Although the invention of the present application has been described with reference to an exemplary embodiment, the invention of the present application is not limited to the above-described exemplary embodiment. The configuration and details of the invention of the present application are open to various modifications within the scope of the invention of the present application that will be clear to one of ordinary skill in the art. This application claims the benefits of priority based on Japanese Patent Application No. 2012-031730 for which application was submitted on Feb. 16, 2012 and incorporates by citation all of the disclosures of that application.

EXPLANATION OF REFERENCE NUMBERS 100 battery pack device
11-13 series cell unit
20 adjusting device
2a1-2a3 switch
2b1-2b3 current detection unit
2c adjustment unit
2c11-2c13 control unit
2c2 balance control unit
30 load

What is claimed is:

1. An adjusting device connected to which is connected to a first storage battery unit and a second storage battery unit that are connected in parallel with a load, comprising:
 a first switch provided between the first storage battery unit and the load, and a second switch provided between the second storage battery unit and the load, the load wherein the first and second switches are turned ON during detection intervals to provide detection currents from each of the first and second storage battery units;
 a detection unit that receives first detection current and second detection current from, respectively, the first and second storage battery units during the detection intervals; and
 an adjusting unit that:
  determines a highest current between the first and second detection currents,
  determines a first difference between the highest current and the first detection current,
  determines a second difference between the highest current and the second detection current,
  if the first difference exceeds a threshold value and the second difference does not exceed the threshold value:
   adjusts at least a first duration of ON time of the first switch within a first adjustment interval, such that the first duration becomes shorter than a second duration of ON time of the second switch within a second adjustment interval, and
   turns ON the first switch for the first duration within the first adjustment interval to adjust the voltage difference between the first and second storage battery units.

2. The adjusting device of claim 1, wherein the adjusting unit:
 turns ON the second switch for the second duration within the second adjustment interval; and
 causes the second duration to be shorter than the first adjustment interval.

3. The adjusting device of claim 1, wherein the adjusting unit reduces the first duration in proportion to the difference.

4. The adjusting device of claim 1, wherein the adjusting unit calculates the threshold value by multiplying a reference value set based on a rated current of the adjustment unit with a ratio between a sum of first and second detection currents and the rated current.

5. The adjusting device of claim 1, wherein the adjusting unit calculates the threshold value by subtracting an average between the first and second detection currents from the highest current.

6. The adjusting device of claim 1, wherein the adjusting unit adjusts a timing relationship between the first and second durations such that the first duration does not overlap with the second duration.

7. A battery pack device comprising:
 a first storage battery unit and a second storage battery unit connected in parallel with a load;
 a first switch provided between the first storage battery unit and the load, and a second switch provided between the second storage battery unit and the load, wherein the first and second switches are turned ON during detection intervals to provide detection currents from each of the first and second storage battery units;
 a detection unit that detects currents from at least one of the first and second storage battery units during the detection intervals; and
 an adjusting unit that:
  determines a highest current between the first and second detection currents,
  determines a first difference between the highest current and the first detected current,
  determines a second difference between the highest current and the second detected current,
  if the first difference exceeds a threshold value and the second difference does not exceed the threshold value:
   adjusts at least a first duration of ON time of the first switch within a first adjustment interval, such that the first duration becomes shorter than a second duration of ON time of the second switch within a second adjustment interval, and
   turns ON the first switch for the first duration within the first adjustment interval to adjust the voltage difference between the first and second storage battery units.

8. An adjusting method performed by an adjusting device that is connected to a first storage battery unit and a second storage battery unit that are connected in parallel with a load, the adjusting method comprising:
 turning ON a first switch provided between the first storage battery unit and the load and a second switch provided between the second storage battery unit and the load during detection intervals to provide detection currents from each of the first and second storage battery units;
 receiving first detection current and second detection current from, respectively, the first and second storage battery units during the detection intervals;
 determining a highest current between the first and second detection currents;
 determining a first difference between the highest current and the first detection current;
 determining a second difference between the highest current and the second detection current;
 if the first difference exceeds a threshold value and the second difference does not exceed the threshold value:
  adjusting at least a first duration of ON time of the first switch within a first adjustment interval, such that the first duration becomes shorter than a second duration of ON time of the second switch within a second adjustment interval, and
  turning ON the first switch for the first duration within the first adjustment interval to adjust the voltage difference between the first and second storage battery units.

9. The adjusting method of claim 8, further comprising:
 turning ON the second switch for the second duration within the second adjustment interval; and
 causing the second duration to be shorter than the first adjustment interval.

10. The adjusting method of claim 8, further comprising: reducing the first duration in proportion to the difference.

11. The adjusting method of claim 8, further comprising: multiplying a reference value set based on a rated current of the adjustment unit with a ratio between a sum of first and second detection currents and the rated current.

12. The adjusting method of claim 8, further comprising: calculating the threshold value by subtracting an average between the first and second detection currents from the highest current.

13. The adjusting method of claim 8, further comprising: adjusting a timing relationship between the first and second durations such that the first duration does not overlap with the second duration.

* * * * *